March 19, 1963 — S. C. PLETTNER — 3,081,870
SLIDE TRAY AND SLIDE HOLDER
Filed Jan. 12, 1959
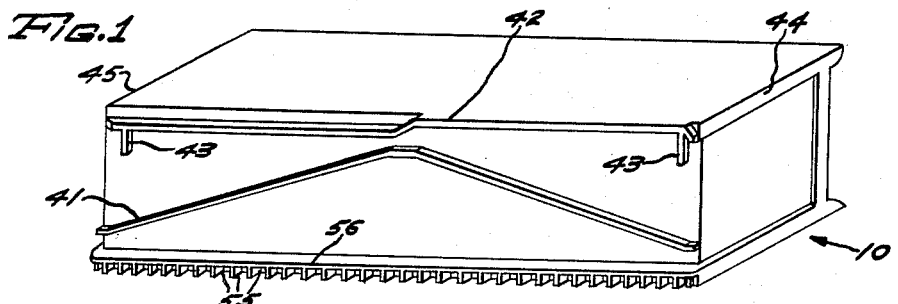
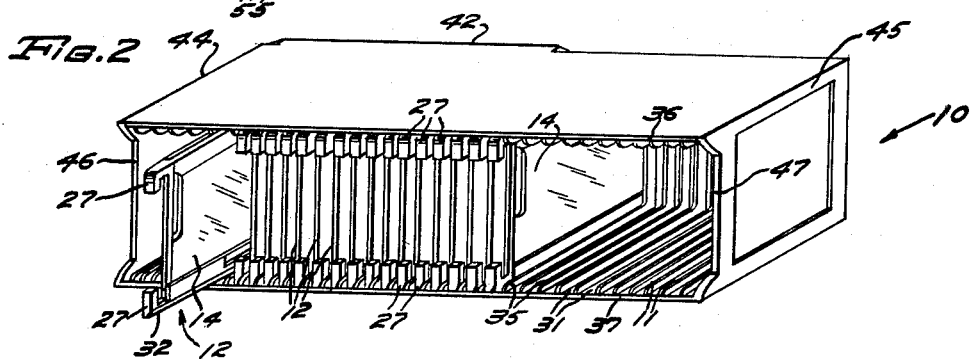
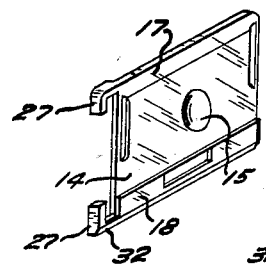
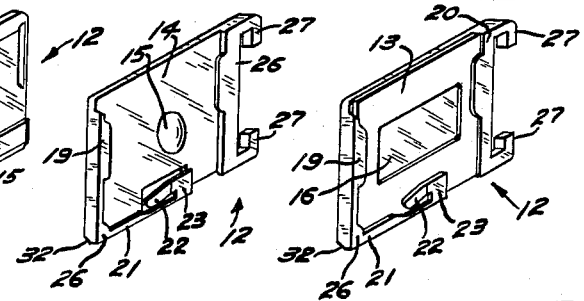
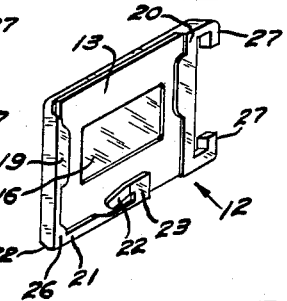
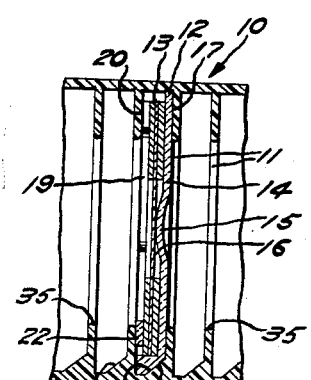
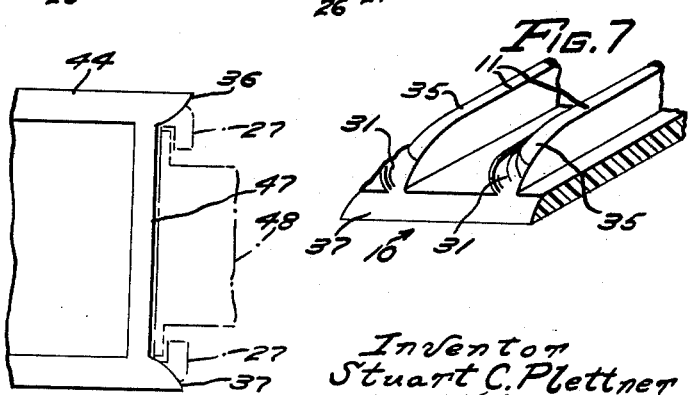
Inventor
Stuart C. Plettner ＃ 3,081,870
SLIDE TRAY AND SLIDE HOLDER
Stuart C. Plettner, Evanston, Ill., assignor to Bell & Howell Company, Chicago, Ill., a corporation of Illinois
Filed Jan. 12, 1959, Ser. No. 786,294
6 Claims. (Cl. 206—62)

This invention relates to a slide tray and slide holder, and more particularly to a slide tray and a slide holder for use in a slide projector having an automatic slide changer.

An object of the invention is to provide new and improved slide tray and slide holder.

Another object of the invention is to provide a slide tray and slide holders covering slides to keep dust from the slides.

Yet another object of the invention is to provide a slide tray having asymmetrical guideways therein for receiving slide holders formed complementarily to the guideways so that the holders can be inserted into the tray only in correctly oriented positions relative to the tray.

A further object of the invention is to provide a slide holder and a slide tray in which the slide holder has a spring portion retaining the holder in the tray and preventing spilling of the holder from the tray.

Further objects and features of the invention will be apparent from the following detailed description of a slide tray and slide holder forming specific embodiments thereof, when read in conjunction with the appended drawings, in which:

FIGS. 1 and 2 are front and rear perspective views of a slide tray and slide holders forming one embodiment of the invention;

FIGS. 3, 4 and 5 are perspective views of the slide holder of FIG. 1, with a slide mount in the holder shown in FIG. 5;

FIG. 6 is an enlarged vertical sectional view of the tray and one holder of FIG. 1;

FIG. 7 is an enlarged fragmentary perspective view of a portion of the slide tray of FIG. 1; and FIG. 8 is a fragmentary end view of the tray of FIG. 1.

The invention provides a novel tray and slide holder which cooperate to prevent spilling of the holder from the tray even when the tray is turned to a position in which the open entrance portion is turned downwardly. This is effected by one or more spring portions molded integrally with the slide holder at the edge of the holder and adapted to frictionally engage the tray. The tray and slide holder also are formed with interfering portions which prevent insertion of the slide holder into the tray in an improper position. In a preferred form of the invention having this orienting feature, the tray has an open side for insertion and removal of the slide holder into and out of the tray with opposed guideways one of which is partially blocked and the corresponding edge portion of the slide holder is relieved to permit insertion of the holder into the tray.

Referring now in detail to the drawings, a slide tray 10 is open on one side thereof and has U-shaped septums 11 forming guideways for the reception of slide holders 12. The slide holders preferably are of the type disclosed and claimed in copending application Serial No. 786,374 for "Slide Holders for Holding Slide Mounts and Methods of Making the Same." Each slide holder is adapted to retain a slide mount 13 at one side of a transparent panel 14 and the panel has a bulge or shallow central boss 15 for pre-popping or pre-stressing a transparency or film 16 to the position which the film normally assumes only when heated during projection. The panel 14 is recessed or set back from thick guide bar portions 17 and 18 positioned at the upper and lower edges of the slide holder. The guide bar portions 17 and 18 overhang or project laterally beyond the panel and engage the septums 11 to serve as the guiding portions of the panel. Similarly on the other side of the slide holder, edge portions 19, 20 and 21, and leaf spring member 22 and its supporting tab or finger 23 engage the septums and also project beyond the slide mount. End tabs or fingers 24 and 25 and corner tab 26 coact with the end portions of the holder and the panel to form a guide for the slide mount.

The slide holder 12 also has hook portions 27 by which the slide holder may be pulled from the tray to a projecting station and pushed back into the tray. A mechanism for effecting these movements of the slide holder is disclosed and claimed in copending application Serial No. 799,404 for "A Slide Projector" and assigned to the same assignee as the instant application.

To insure that the slide holders 12 are never inserted into the tray 10 in any position except the correct one in which the film 16 is in front of the panel 14 of each slide holder, blocking base portions 31 are formed on lower left hand portions of the lower portions of the septums 11, as viewed in FIG. 6, and the lower edge or guide bar 18 of each slide holder is correspondingly relieved or bevelled as indicated at 32. This makes each guideway formed by adjacent septums asymmetric in transverse cross-section and each slide holder complementary thereto. The above orienting construction positively blocks improper positioning of the slide holders in the tray while permitting free sliding movement thereof when properly oriented.

The resilient leaf spring finger 22 is biased to project outwardly from the front of the slide holder as illustrated in FIG. 5 and presses against the face of the septum 11 as shown in FIG. 6. The frictional engagement of the spring finger with the face of the septum is sufficient to retain the slide holders in the tray. The forward outer end of the spring while projecting somewhat to the front of the slide holder is guided into the guideway by rounded, tapered end 35 of the septum 11. The forward end of the finger also may be tapered or rounded at its outer corner to facilitate entrance of the finger 22 into the guideway. The tray has tapered top and bottom entrance portions 36 and 37 to facilitate entrance of the slide holders into the tray.

As illustrated in FIG. 1, the tray 10 has a V-shaped cam ledge 41 projecting from the back side thereof for actuating a counting indicator disclosed and claimed in above-mentioned copending application Serial No. 799,404 and assigned to the same assignee as the instant application. The cam 41 is integral with the molded plastic tray, and, in addition to its function of actuating the indicator, also acts as a reinforcing rib. A second cam ledge 42 also cooperates with the indicator and strengthens the tray. Bracing portions 43 support the ledge 42. The tray has rigid strengthening end frame portions 44 and 45 which have clearance portions 46 and 47 at the open side of the tray to permit movement of the ends of the tray past the slide holder pushing and pulling member shown schematically at 48 (FIG. 8) when the member is positioned in lateral alignment with the space between the hooks 27, the clearance being shown in FIG. 8. The tray top and bottom portions 36 and 37 project slightly beyond the hooks 27 of the slide holder when the holders are fully inserted into the tray to provide projection for the slide holders. Since the tray is open only at its entrance side and is imperforate on the other five sides, dust is kept from the tray and away from the slides and slide holders in the tray. The tray has a rack portion 55 projecting from its lower back side with an overhanging ledge 56 strengthening the teeth of the rack portion. The rack portion is used to index the tray when it is in a slide projector.

While the invention is thus described, it is not wished

What is claimed is:

1. In a slide tray and holder, a tray having top and bottom septums defining horizontal guideways, the bottom septums being provided with blocking portions extending into one side of the lower edge of each of the guideways and the upper edge of each of the guideways being unobstructed, and a plurality of slide holders each being relieved on one side of the lower edge thereof to clear the blocking portion in one of the guideways and being unrelieved at the upper edge thereof so that the slide holder can be inserted into the guideway only when the bottom edge of the slide holder positioned so that the relieved portion is adjacent to the blocking portion.

2. A slide tray comprising a top wall portion, a side wall portion and a bottom wall portion, the tray being open at the other side thereof, the wall portions having septums defining guideways, the portions of the septums along the bottom wall portion having blocking portions extending into one side of each of the lower edge portions of the guideways, the upper edge portions of the guideways being unobstructed.

3. In a slide tray and holder, a slide tray having upper and lower guideways and having an opening at one side thereof for insertion and removal of slide holders, one corner portion of each lower guideway being filled with a wedge-shaped portion, and a plurality of slide holders having upper and lower guide bars fitting into the guideways, the lower guide bar of each slide holder being relieved at one corner portion thereof corresponding to the filled corner portion of each lower guideway and being complementary in cross-sectional shape to the lower guideway so that the slide holder can be inserted into the tray in only one position.

4. In a slide tray and slide holders, a slide tray open at one side and having a plurality of generally V-shaped parallel septums defining guideways for receiving slide holders, and a plurality of slide holders having front and rear sides, each of the guideways having a blocking portion asymmetrically positioned therein, each of the slide holders having an asymmetrically positioned relieved portion providing clearance to permit insertion of the slide holder into each guideway in only one position relative to the tray, the upper portion of each guideway and the upper portion of each slide holder being complementary in shape, the lower portion of each guideway and the lower portion of each slide holder being asymmetrical in transverse cross-section and being complementary in shape relative to each other, the shape of the upper portion of each slide holder being such relative to the lower portion of each guideway as to prevent insertion of the slide holder into the guideway when the slide holder is in an inverted position.

5. In a slide tray and slide holders, a slide tray open at one side and having a plurality of generally V-shaped parallel septums defining guideways for receiving slide holders, and a plurality of slide holders having front and rear sides, each of the slide holders having an asymmetrically relieved portion providing clearance to permit insertion of the slide holder into each guideway in only one position relative to the tray, the upper portion of each guideway being symmetrical in transverse cross-section and at least a portion of the lower portion of each guideway being asymmetrical in transverse cross-section, the upper portion of each slide holder being complementary in shape to that of the upper portion of each guideway and the lower portion of each slide holder being so shaped as to fit in the lower portion of each guideway.

6. In a slide holder for a transparency mount, a frame portion having top and bottom edge guide portions extending generally horizontally, the bottom edge guide portion being relieved on only one side edge and along substantially the entire length of said bottom edge guide portion, the top edge guide portion being unrelieved along the side edges thereof for at least substantial portions of the length thereof.

References Cited in the file of this patent

UNITED STATES PATENTS

| | | |
|---|---|---|
| 2,422,594 | Stengren | June 17, 1947 |
| 2,829,767 | Scripture | Apr. 8, 1958 |
| 2,900,074 | Windman | Aug. 18, 1959 |
| 2,919,021 | Robinson et al. | Dec. 29, 1959 |
| 2,954,033 | Marsden | Sept. 27, 1960 |